US008531526B1

(12) United States Patent
Spence et al.

(10) Patent No.: US 8,531,526 B1
(45) Date of Patent: Sep. 10, 2013

(54) WEARABLE VIDEO RECORDER AND MONITOR SYSTEM AND ASSOCIATED METHOD

(76) Inventors: Clinton A. Spence, Brooklyn, NY (US); Ian Terrelonge, Brooklyn, NY (US)

( * ) Notice: Subject to any disclaimer, the term of this patent is extended or adjusted under 35 U.S.C. 154(b) by 296 days.

(21) Appl. No.: 12/868,361

(22) Filed: Aug. 25, 2010

Related U.S. Application Data

(60) Provisional application No. 61/236,696, filed on Aug. 25, 2009.

(51) Int. Cl.
*H04N 7/18* (2006.01)

(52) U.S. Cl.
USPC .......................................................... 348/158

(58) Field of Classification Search
USPC ........................................ 348/51–56, 61–160
See application file for complete search history.

(56) References Cited

U.S. PATENT DOCUMENTS

| | | | |
|---|---|---|---|
| 4,823,240 A | 4/1989 | Shenker | |
| 5,886,739 A | 3/1999 | Winningstad | |
| 5,912,653 A * | 6/1999 | Fitch | 345/87 |
| 7,273,321 B2 | 9/2007 | Woodman | |
| 7,922,089 B2 * | 4/2011 | Kotlarsky et al. | 235/462.42 |
| 8,179,604 B1 * | 5/2012 | Prada Gomez et al. | 359/630 |
| 2002/0140849 A1 * | 10/2002 | Slatter et al. | 348/375 |
| 2005/0063582 A1 * | 3/2005 | Park et al. | 382/154 |
| 2006/0284792 A1 * | 12/2006 | Foxlin | 345/8 |
| 2007/0198121 A1 * | 8/2007 | Zheng | 700/138 |
| 2009/0189981 A1 * | 7/2009 | Siann et al. | 348/143 |
| 2010/0020185 A1 * | 1/2010 | Sako et al. | 348/211.1 |
| 2010/0130846 A1 * | 5/2010 | Rytky | 600/388 |

* cited by examiner

*Primary Examiner* — Sath V Perungavoor
*Assistant Examiner* — Talha Nawaz

(57) ABSTRACT

A garment security system includes a clothing garment adapted to be worn over an upper torso of the user. A mini-camera may be located in a back portion of the clothing garment and may further be suitably positioned to provide a clear view of the area behind the user. The system may include a user interface such that upon receiving a user input, may generate and transmit a control signal to the mini-camera for manually manipulating an operating mode of the mini-camera. A portable communication device may be communicatively coupled to the mini-camera to display a captured video of the area behind the user. The frame rate of the video capture may be varied to provide a higher frame capture rate or a lower frame capture rate upon occurrence of a trigger event. The portable communication device may further be adapted to be worn on a wrist of the user.

5 Claims, 4 Drawing Sheets

WEARABLE VIDEO RECORDER AND MONITOR SYSTEM AND ASSOCIATED METHOD

CROSS REFERENCE TO RELATED APPLICATIONS

This application claims the benefit of U.S. Provisional Application No. 61/236,696, filed Aug. 25, 2009, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to recording and monitoring systems and, more particularly, to a wearable video recorder and monitor system for providing users with an easy and convenient means of providing a clear view of an area behind them.

2. Prior Art

The safety of one's self and family has become a paramount concern in today's increasingly violent world. With incessant news reports of rapes, muggings, carjacking, home invasions, and hate crimes, the American public is constantly seeking ways to protect themselves from becoming victims. While carrying a handgun offers many the best sense of security, even more are deterred from employing these devices. Not only are guns very dangerous when used by those who are not properly trained to operate them, the hassles of acquiring the necessary licensing and permits for carrying these weapons is a deterrent for many. As a result, non-lethal, easily acquired self-defense products have become much in demand.

Over the last several years the popularity of self defense sprays, also known as tear gas, mace or pepper spray has grown tremendously. The rising rate of violent crimes, the publicity and media coverage of such crimes, and the reasoning, "If it's good enough for the cops, its good enough for me," has led more and more citizens to rely on these devices. Normally configured into a compact canister that can be easily stored in a purse, pocket, or hooked to a keychain, these self defense sprays are designed to be always at the ready, whenever needed. Yet, as effective as pepper spray can be at warding off an attack, one must have sufficient time to access and activate it. This can be challenging, if not impossible, if one is attacked from behind. Unaware of an approaching threat from the rear, walkers, joggers, mail carriers, and anyone out and about can become a victim of attack before they even realize what is happening, and can do anything to stop it.

Accordingly, a need remains for a system in order to overcome the above-noted shortcomings. The present invention satisfies such a need by providing a wearable video recorder and monitor system that is convenient and easy to use, is durable yet lightweight in design, is versatile in its applications, and provides users with a clear view of an area behind them.

BRIEF SUMMARY OF THE INVENTION

In view of the foregoing background, it is therefore an object of the present invention to provide an apparatus for providing a user a clear view of an area behind the user. These and other objects, features, and advantages of the invention are provided by a wearable video recorder and monitor system.

The garment security system may include a clothing garment adapted to be worn over an upper torso of the user. A mini-camera may be located in a back portion of the clothing garment and affixed thereto and may further be suitably positioned to provide a clear view of the area behind the user. The system may include a user interface such that upon receiving a user input, may generate and transmit a control signal to the mini-camera for manually manipulating an operating mode of the mini-camera. A portable communication device may be communicatively coupled to the mini-camera to display a captured video of the area behind the user.

The frame rate of the video capture may further be varied to provide a higher frame capture rate or a lower frame capture rate upon occurrence of a trigger event. The portable communication device may further be adapted to be worn on a wrist of the user. Such an arrangement provides the unexpected and unpredictable advantage of providing the user with a view of the immediate area behind his or her back when commuting in unsafe neighborhoods or crowded areas. In this way, an assailant or snatch thief for example, coming from behind may easily be captured by the mini-camera so that the user may provide some form of preemptive measure to protect himself or herself against the assailant or snatch thief.

The mini-camera may include a video capturing device capable of operating at alternate frame capturing rates. A sensor may be communicatively coupled to the video capturing device. A processor may be communicatively coupled to the sensor and the video capturing device. A memory may be communicatively coupled to the processor and may include software instructions executable by the processor for causing the mini-camera to automatically toggle between the alternate frame capturing rates upon detection of the trigger event. A transceiver may be communicatively coupled to the video capturing device and the processor respectively. In this way, the video is displayed on the portable communication device such that the user may be able to view the video while facing away from the area behind the user. Such an arrangement may provide the unexpected and unpredictable advantage of detecting an abnormally fast movement towards the user from behind. The frame rate may further be automatically increased such that when the faster than normal motion is detected, the intruding image may be captured by the mini-camera and displayed clearly on the video.

The portable communication device may include a receiver communicatively coupled to the transceiver. A display screen may be communicatively coupled to the receiver. A transducer may further be communicatively coupled to the display screen such that the video is received from the mini-camera and displayed on the display screen at the higher or lower frame capture rate. The transducer may further he automatically toggled to an on mode when the video is displayed at the higher frame capture rate. Such an arrangement provides the unexpected and unpredictable advantage of only activating the camera when the triggering event is detected. In this way, the system may be operated on a power-safe mode similar to, for example computer monitors to prolong the usable duration of the system when in use.

The software instructions may include a control logic algorithm that includes the chronological steps of setting a first frame capture rate when no trigger event has been detected, and upon receiving an initial detection signal from the sensor, setting a second frame capture rate that is higher than the first frame capture rate and further, periodically lowering the second frame capture rate as time passes from the initial detection signal. Such an arrangement provides the unexpected and unpredictable advantage of "intelligently" controlling the frame rates of the mini-camera to ensure that the memory may be utilized efficiently. In this way, the system may be able to capture as many triggering events as possible without using up its entire memory within a short duration of time.

The invention may include a method of utilizing a stealthy garment security system for providing a user a clear view of an area behind the user. Such a method may include the chronological steps of: providing a clothing garment; providing and affixing a mini-camera in a back portion of the clothing garment such that the mini-camera is suitably positioned to provide a clear view of the area behind the user; providing for wearing the clothing garment over an upper torso of the user; providing a user interface; upon receiving a user input, the user interface generating and transmitting a control signal to the mini-camera for manually manipulating an operating mode of the mini-camera; providing and communicatively coupling a portable communication device to the mini-camera; wearing the portable communication device on a wrist of the user; displaying a captured video of the area behind the user on the portable communication device; and varying a frame rate of video capture to provide a higher frame capture rate or a lower frame capture rate upon occurrence of a trigger event.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Figure 1:
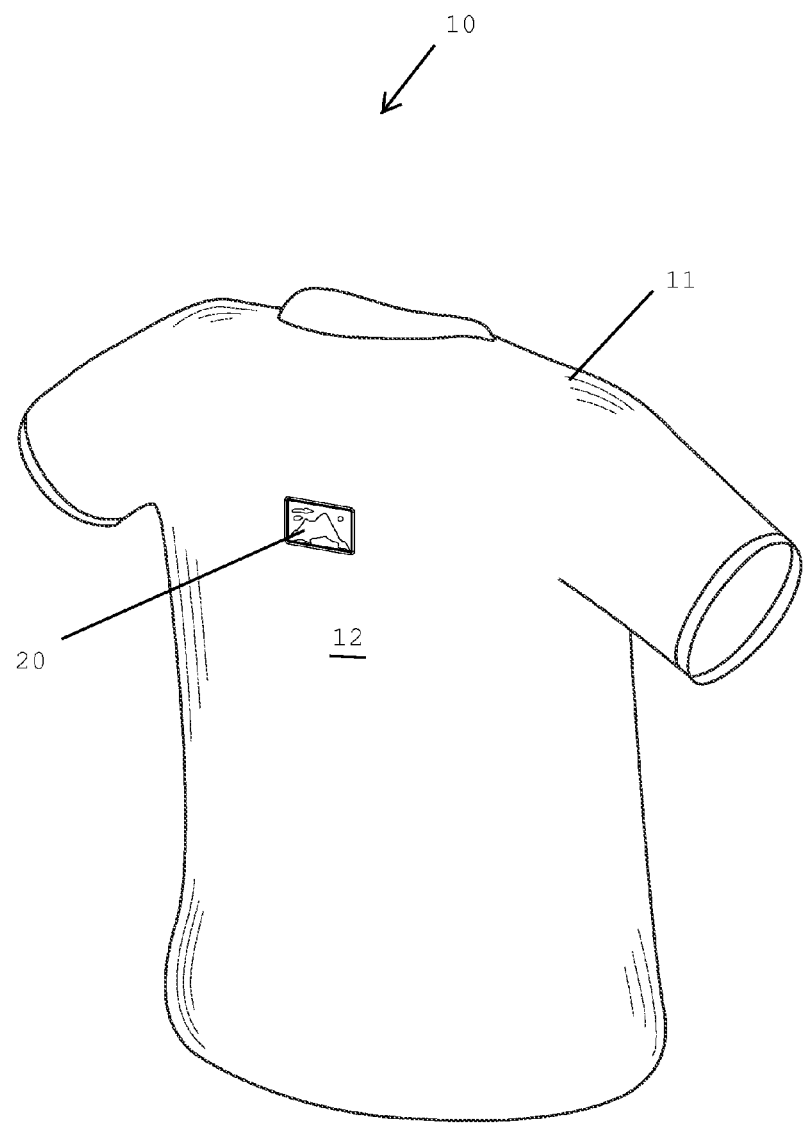
FIG. 1 is a perspective view showing the mini-camera of the wearable video recorder and monitor system positioned in a back portion of a clothing garment, in accordance with the present invention.

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "present invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The below disclosed subject matter is to be considered illustrative, and not restrictive, and the appended claims are intended to cover all such modifications, enhancements, and other embodiments which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

Referring generally to FIGS. 1-4, the garment security system 10 may include a clothing garment 11 adapted to be worn over an upper torso of the user. A mini-camera 20 may be located in a back portion 12 of the clothing garment 11 and affixed thereto and may further be suitably positioned to provide a clear view of the area behind the user. The system 10 may further include a user interface 21 such that upon receiving a user input, the user interface 21 may generate and transmit a control signal 90 to the mini-camera 20 for manually manipulating an operating mode of the mini-camera 20. A portable communication device 22 may be communicatively coupled to the mini-camera 20 to display a captured video 91 of the area behind the user.

Advantageously, the frame rate of the video capture may be varied to provide a higher frame capture rate or a lower frame capture rate upon occurrence of a trigger event. The portable communication device 22 may be adapted to be worn on a wrist of the user. Such an arrangement provides the unexpected and unpredictable advantage of providing the user with a view of the immediate area behind his or her back when commuting in unsafe neighborhoods or crowded areas. In this way, an assailant or thief, for example, coming from behind the user may easily be captured by the mini-camera 20 so that the user may take a preemptive measure to protect himself or herself against the assailant or thief. Without having to turn around and view the assailant, the user may inconspicuously take defensive measures prior to being attacked. For example, the user may take out a spray canister to defend herself/himself.

Figure 4:
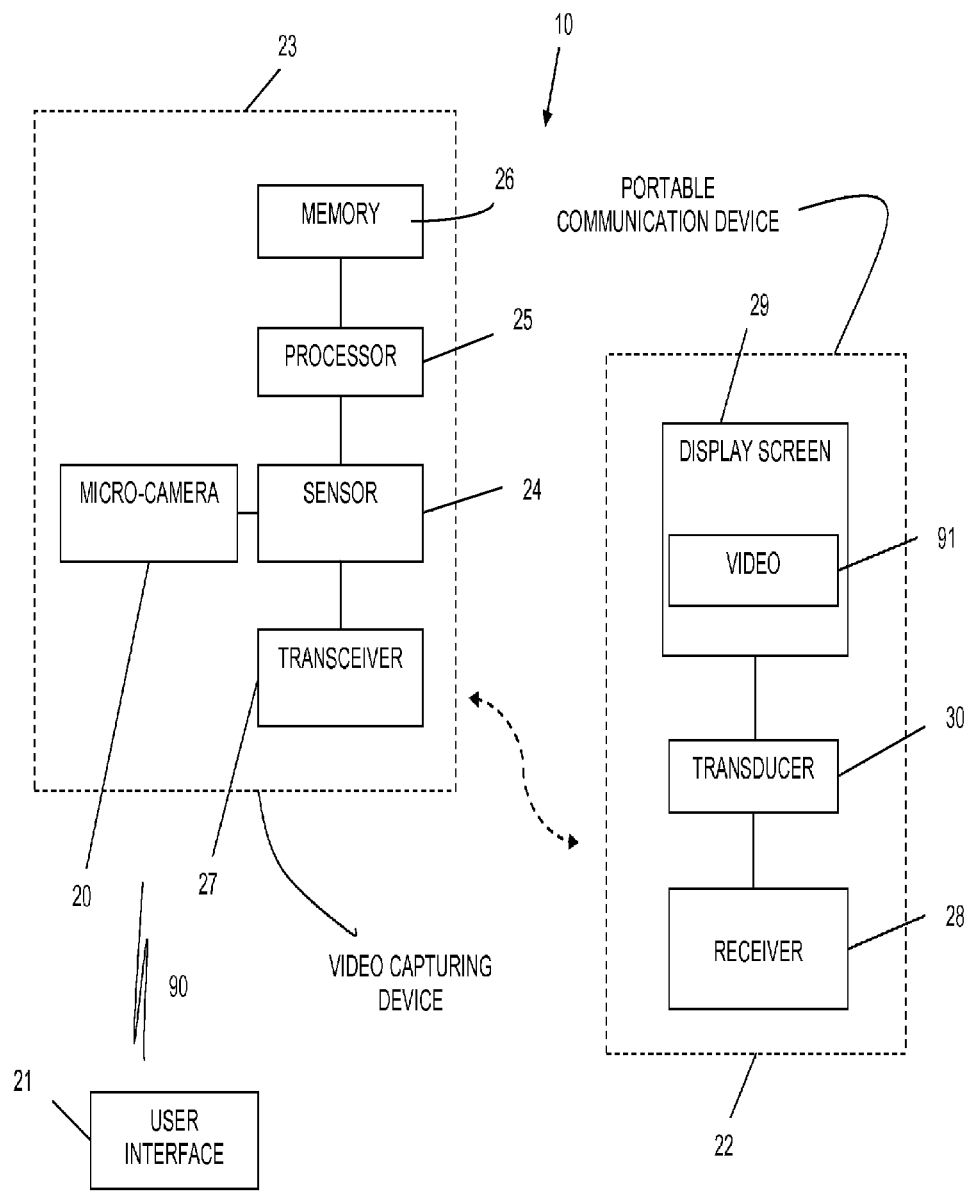
FIG. 4 is a high level schematic block diagram of the system.

Referring to FIG. 4, the mini-camera 20 may include a video capturing device 23 capable of operating at alternate frame capturing rates. A sensor 24 may be communicatively coupled to the video capturing device 23. A processor 25 may be communicatively coupled to the sensor 24 and the video capturing device 23. A memory 26 may be communicatively coupled to the processor 25 and may include software instructions executable by the processor 25 for causing the mini-camera 20 to automatically toggle between the alternate frame capturing rates upon detection of the trigger event. A transceiver 27 may be communicatively coupled to the video capturing device 23 and the processor 25 respectively. In this way, the video 91 is displayed on the portable communication device 22 such that the user is able to view the video 91 while facing away from the area behind the user. Such an arrangement provides the unexpected and unpredictable advantage of detecting an abnormally fast movement towards the user from behind the user. The frame rate may further be automatically increased such that when the faster than normal (walking speed) motion is detected, the intruding image may be captured by the mini-camera 20 and displayed clearly on the video 91.

Referring again to FIG. 4, the portable communication device 22 may include a receiver 28 communicatively coupled to the transceiver 27. A display screen 29 may be communicatively coupled to the receiver 28. A transducer 30 may further be communicatively coupled to the display screen 29 such that the video 91 is received from the mini-camera 20 and displayed on the display screen 29 at the higher or lower frame capture rate. The transducer 30 may be automatically toggled to an on mode when the video 91 is displayed at the higher frame capture rate. Such an arrangement provides the unexpected and unpredictable advantage of only activating the mini-camera 20 when the triggering event is detected. In this way, the system 10 may be operated on a power-safe mode similar to, for example, computer monitors to prolong the usable duration of the system 10 when in use. Also, by automatically toggling on the transducer 30 when during the higher frame capture rate, the user is automatically and effectively notified that a faster-than-normal moving object is approaching him/her from behind. This alerts the user to quickly take precautionary measures such as moving out of the travel path of the object (bicycle, for example).

Notably, the software instructions may include a control logic algorithm that includes the chronological steps of: initially setting a first frame capture rate when no trigger event has been detected; upon receiving an initial detection signal from the sensor 24, setting a second frame capture rate that is higher than the first frame capture rate; and periodically lowering the second frame capture rate as time passes from the initial detection signal. Such an arrangement provides the unexpected and unpredictable advantage of "intelligently" controlling the frame capture rates of the mini-camera 20 to ensure that the memory 26 may be utilized efficiently. In this way, the system 10 may be able to capture as many triggering events as possible without using up its entire memory 26 within a short duration of time. Furthermore, the memory 26 is most effectively utilized when the faster-than-normal moving object is initially detected at the higher frame capture rate whereas the video is captured at a lower frame capture rate when the object either slows down or passes in front of the user.

The invention may further include a method of utilizing a stealthy garment security system 10 for providing a user a clear view of an area behind the user. Such a method may include the chronological steps of: providing a clothing garment 11; providing and affixing a mini-camera 20 to a back portion 12 of the clothing garment 11 such that the mini-camera 20 is suitably positioned to provide a clear view of the area behind the user; wearing the clothing garment 11 over an upper torso of the user; providing a user interface 21; upon receiving a user input, the user interface 21 generating and transmitting a control signal 90 to the mini-camera 20 for manually manipulating an operating mode of the mini-camera 20; providing and communicatively coupling a portable communication device 22 to the mini-camera 20; wearing the portable communication device 22 on a wrist of the user; displaying a captured video 91 of the area behind the user on the portable communication device 22; and varying a frame rate of video capture to provide a higher frame capture rate or a lower frame capture rate upon occurrence of a trigger event.

Figure 2:
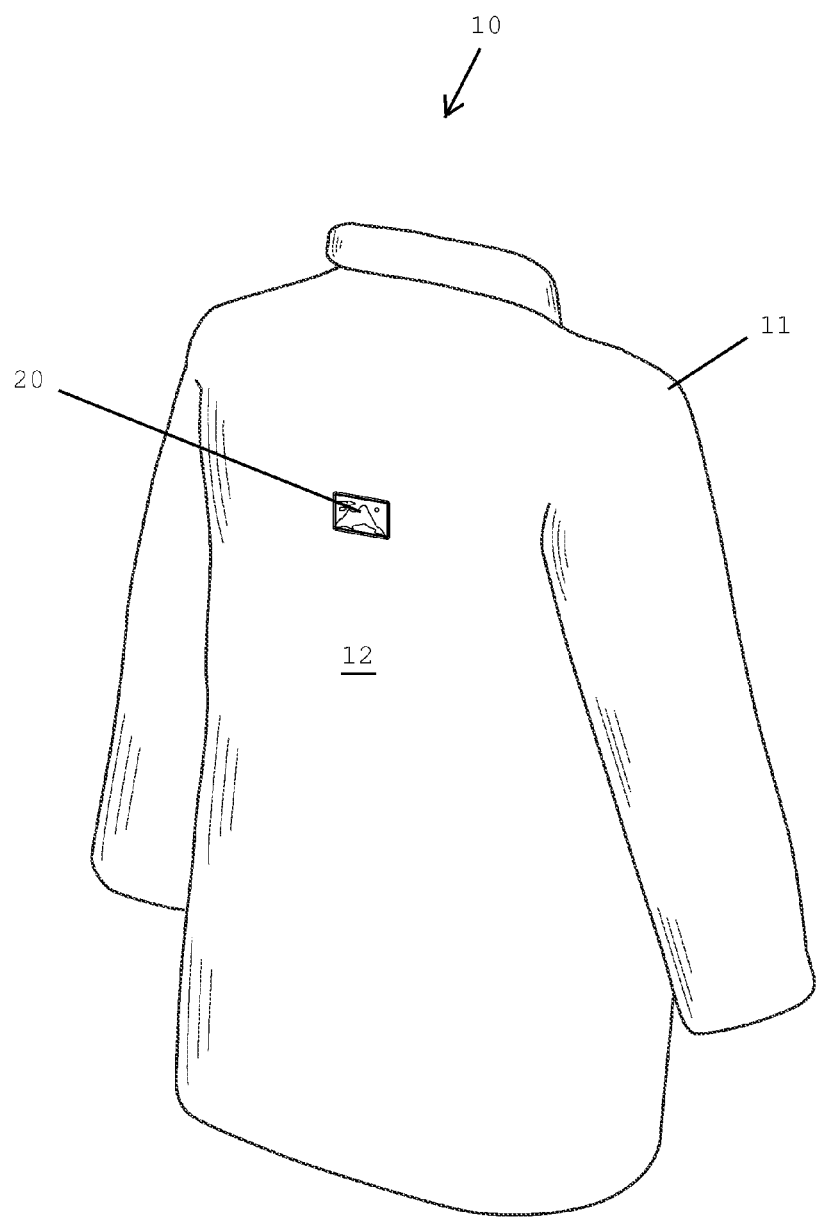
FIG. 2 is a perspective view showing the mini-camera of the system positioned in a back portion of another clothing garment, in accordance with the present invention.

Referring to FIGS. 1 and 2, the mini camera 20 may be housed on the back portion 12 of a garment 11, such as a t-shirt or a windbreaker jacket. The mini camera 20 may be similar in size and operation to the tiny "nanny cams" that can be built into stuffed animals or discretely hidden in the home. One skilled in the art understands that a variety of mini-cameras may be employed without departing from the true scope and spirit of the invention.

The hand-held portable communication device 22 may feature VELCRO straps along its backside to allow users to strap it to their wrist. The hand-held portable communication device 22 may house a receiver 28 that electronically communicates with a display screen 29 and a transducer 30, respectively.

The user interface 21 may include a variety of stand-alone or shared devices that are capable of generating and transmitting a control signal 90 upon receiving a user input. For example, exemplary user interface devices may include a remote controller employing RF, infra-red, acoustic or cellular technology, as well known in the industry. In alternate embodiments, the user interface 21 may include a handheld computer, a PDA, a cell phone, a keyboard, a mouse, etc. that may be comprised of commercially available hardware and software operating systems, for example. These user interfaces are intended to represent a broad category of exemplary user interfaces capable of functioning in accordance with the present invention. Of course, the user interfaces may include other components, peripherals and software applications provided they are compatible and capable of cooperating with remaining devices of the present invention. In addition, the user interface 21 may include information, documents, data and files needed to provide functionality and enable performance of methodologies in accordance with an exemplary embodiment of the invention.

Figure 3:
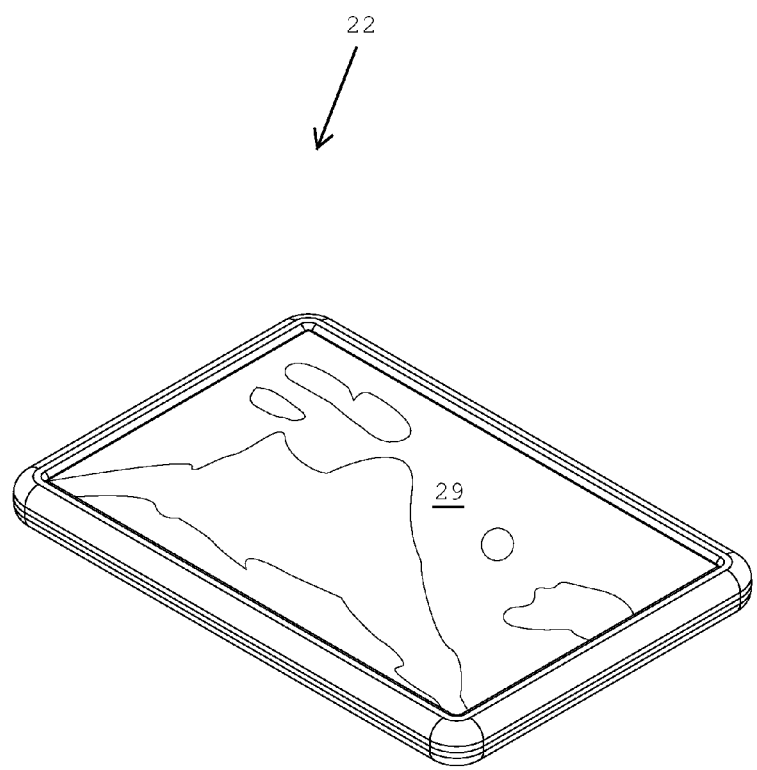
FIG. 3 is a perspective view of the portable communication device of the system.

Referring to FIG. 3, the display screen 29 may be configured for displaying various amounts of textual and/or graphical information. The display may be monochrome or color, of various physical dimensions, of various types. In one embodiment, the display may be suitable for displaying full motion video in color. By way of example and not limitation, the display may be comprised of a liquid crystal display (LCD); a field emission display FED; so called "E-ink" technologies, which employ microspheres having at least two reflectance states; a cathode-ray tube (CRT) display; a gas plasma display; an LED readout configured to display alpha-numeric and graphical information; or any other compatible visual display device. In a preferred implementation, the display is large enough to display, with clarity, one or more lines of information. Optionally, the display screen 29 may be configured with a touch-screen interface, to present a user with a graphical user interface.

As noted above, the frame rate of video capture may be varied so as to provide a higher frame capture rate or a lower frame capture rate upon the occurrence of a trigger event. The inclusion of an adaptive frame capture rate permits higher or lower frequency rates to be employed in particular applications in which such might be desirable. Additionally, the resolution may be varied so as to provide a different resolution in response to a trigger event. For example, upon recognition of a trigger event, the video capturing device 23 may record at a higher or lower resolution than that employed prior to the trigger event. Further, an exponential change in resolution may be employed. The change in resolution may be delayed for a predetermined number of frames following the trigger event.

Video data may be stored in the memory buffer using different storage techniques to achieve desired objectives. It may be desired to have higher frame storage rates around the trigger event with successively lower effective storage rates as one progresses further in time away from the trigger event (both before and after the event). It is appreciated that any number of storage methods may be employed via selective addressing of a semiconductor memory to extend the period of time captured within the semiconductor memory buffer, or to achieve almost any frame capture profile that may be desired.

The system 10 may wirelessly communicate over a variety of conventional communication protocols. Further, the system 10 can use any communication network that allows the user to learn the threat level of the triggering event via the detection signal.

When activated, the user has a clear view of the surrounding area behind him/her. Whether jogging, strolling around the neighborhood, or walking a dog through the park, the user would essentially have eyes in the back of their head. As a result, should the user notice a stranger coming up behind, he or she may have ample time to grab pepper spray or another weapon, and confront the would-be assailant before becoming a victim.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention. In particular, with respect to the above description, it is to be realized that the optimum dimensional relationships for the parts of the present invention may include variations in size, materials, shape, form, function and manner of operation.

What is claimed as new and what is desired to secure by Letters Patent of the United States is:

1. A stealthy garment security system for providing a user a clear view of an area behind the user, said garment security system comprising:

a clothing garment adapted to be worn over an upper torso of the user;

a mini-camera affixed to said clothing garment, said mini-camera being suitably positioned to provide the clear view of the area behind the user;

a user interface, upon receiving a user input, generating and transmitting a control signal to said mini-camera for manually manipulating an operating mode of said mini-camera; and a portable communication device communicatively coupled to said mini-camera and displaying a captured video of the area behind the user;

wherein a frame rate of video capture is varied to provide a higher frame capture rate or a lower frame capture rate upon occurrence of a trigger event;

wherein said portable communication device is adapted to be worn on a wrist of the user;

wherein said user interface is remotely spaced from said mini-camera and said portable communication device;

wherein said mini-camera comprises:

a video capturing device capable of operating at alternate frame capturing rates;

a sensor communicatively coupled to said video capturing device;

a processor communicatively coupled to said sensor and said video capturing device;

a memory communicatively coupled to said processor and including software instructions executable by said processor for causing said mini-camera to automatically toggle between said alternate frame capturing rates upon detection of the trigger event; and a transceiver communicatively coupled to said video capturing device and said processor respectively;

wherein the video is displayed on said portable communication device such that the user is able to view the video while facing away from the area behind the user;

wherein said software instructions comprise:

a control logic algorithm including chronological steps of setting a first frame capture rate when no trigger event has been detected;

upon receiving an initial detection signal from said sensor, setting a second frame capture rate that is higher than said first frame capture rate;

and periodically lowering said second frame capture rate as time passes from said initial detection signal.

2. The garment security system of claim 1, wherein said portable electronic device comprises:

a receiver communicatively coupled to said transceiver;

a display screen communicatively coupled to said receiver; and a transducer communicatively coupled to said display screen; wherein the video is received from said mini-camera and displayed on said display screen at said higher or lower frame capture rate;

wherein said transducer automatically toggles to an on mode when the video is displayed at the higher frame capture rate.

3. A stealthy garment security system for providing a user a clear view of an area behind the user, said garment security system comprising:

a clothing garment adapted to be worn over an upper torso of the user;

a mini-camera located in a back portion of said clothing garment and affixed thereto, said mini-camera being suitably positioned to provide the clear view of the area behind the user;

a user interface, upon receiving a user input, generating and transmitting a control signal to said mini-camera for manually manipulating an operating mode of said mini-camera; and a portable communication device communicatively coupled to said mini-camera and displaying a captured video of the area behind the user;

wherein a frame rate of video capture is varied to provide a higher frame capture rate or a lower frame capture rate upon occurrence of a trigger event;

wherein said portable communication device is adapted to be worn on a wrist of the user;

wherein said user interface is remotely spaced from said mini-camera and said portable communication device;

wherein said mini-camera comprises:

a video capturing device capable of operating at alternate frame capturing rates;

a sensor communicatively coupled to said video capturing device;

a processor communicatively coupled to said sensor and said video capturing device;

a memory communicatively coupled to said processor and including software instructions executable by said processor for causing said mini-camera to automatically toggle between said alternate frame capturing rates upon detection of the trigger event; and a transceiver communicatively coupled to said video capturing device and said processor respectively;

wherein the video is displayed on said portable communication device such that the user is able to view the video while facing away from the area behind the user;

wherein said software instructions comprise:

a control logic algorithm including chronological steps of setting a first frame capture rate when no trigger event has been detected;

upon receiving an initial detection signal from said sensor, setting a second frame capture rate that is higher than said first frame capture rate; and periodically lowering said second frame capture rate as time passes from said initial detection signal.

4. The garment security system of claim 2, wherein said portable electronic device comprises:

a receiver communicatively coupled to said transceiver;

a display screen communicatively coupled to said receiver; and a transducer communicatively coupled to said display screen;

wherein the video is received from said mini-camera and displayed on said display screen at said higher or lower frame capture rate;

wherein said transducer automatically toggles to an on mode when the video is displayed at the higher frame capture rate.

5. A method of utilizing a stealthy garment security system for providing a user a clear view of an area behind the user, said method comprising the chronological steps of:

providing a clothing garment;

providing and affixing a mini-camera in a back portion of said clothing garment such that said mini-camera is suitably positioned to provide the clear view of the area behind the user;

wearing said clothing garment over an upper torso of the user; providing a user interface;

upon receiving a user input, said user interface generating and transmitting a control signal to said mini-camera for manually manipulating an operating mode of said mini-camera;

providing and communicatively coupling a portable communication device to said mini-camera;

wearing said portable communication device on a wrist of the user;

displaying a captured video of the area behind the user on said portable communication device; and varying a frame rate of video capture to provide a higher frame capture rate or a lower frame capture rate upon occurrence of a trigger event;

wherein said user interface is remotely spaced from said mini-camera and said portable communication device;

wherein said mini-camera comprises:

a video capturing device capable of operating at alternate frame capturing rates;

a sensor communicatively coupled to said video capturing device;

a processor communicatively coupled to said sensor and said video capturing device;

a memory communicatively coupled to said processor and including software instructions executable by said processor for causing said mini-camera to automatically toggle between said alternate frame capturing rates upon detection of the trigger event; and a transceiver communicatively coupled to said video capturing device and said processor respectively;

wherein the video is displayed on said portable communication device such that the user is able to view the video while facing away from the area behind the user;

wherein said software instructions comprise:

a control logic algorithm including chronological steps of setting a first frame capture rate when no trigger event has been detected;

upon receiving an initial detection signal from said sensor, setting a second frame capture rate that is higher than said first frame capture rate; and periodically lowering said second frame capture rate as time passes from said initial detection signal.

* * * * *